United States Patent [19]

Park

[11] Patent Number: 5,923,815
[45] Date of Patent: Jul. 13, 1999

[54] APPARATUS AND METHOD FOR DECODING MPEG VIDEO DATA

[75] Inventor: Pan-Gi Park, Suwon, Rep. of Korea

[73] Assignee: Samsung Electronics Co., Ltd., Kyungki-Do, Japan

[21] Appl. No.: 08/764,270

[22] Filed: Dec. 12, 1996

[30] Foreign Application Priority Data

Feb. 13, 1996 [KR] Rep. of Korea .................. 96-3411

[51] Int. Cl.$^6$ .................................................. H04N 7/26
[52] U.S. Cl. .............................. 386/111; 386/68; 348/845
[58] Field of Search ................................ 386/6, 27, 33, 386/67–68, 109–112, 81–82; 348/419, 845; H04N 7/26

[56] References Cited

U.S. PATENT DOCUMENTS

| | | | |
|---|---|---|---|
| 5,187,697 | 2/1993 | Muramatsu et al. | 358/335 |
| 5,255,102 | 10/1993 | Fushiki | 358/342 |
| 5,535,008 | 7/1996 | Yamagishi et al. | 358/342 |
| 5,557,331 | 9/1996 | Honjo | 348/410 |
| 5,592,299 | 1/1997 | Boyce et al. | 386/68 |
| 5,604,602 | 2/1997 | Guillotel et al. | 386/33 |
| 5,627,809 | 5/1997 | Honjo | 386/111 |

Primary Examiner—Wendy Garber
Assistant Examiner—Vincent F. Boccio
Attorney, Agent, or Firm—Sughrue Mion, Zinn, Macpeak & Seas, PLLC

[57] ABSTRACT

There is disclosed an apparatus for decoding and reproducing moving picture experts group (MPEG) video data, including: an encoded data input unit for receiving MPEG video data and outputting a data signal; a data analyzing unit for receiving the data signal which corresponds to a respective portion of the video data, and deciding whether or not the portion should be decoded; a memory interface unit for outputting a control signal in response to an output signal of the data analyzing unit; an external memory unit for storing the MPEG video data in response to the control signal; a data decoding unit for reading and decoding the MPEG video data stored in the external memory unit and restoring the MPEG data in the external memory unit; and a digital video output unit for reading the decoded data out of the external memory unit and outputting the data at a predetermined time. The apparatus operates such that unnecessary data is not stored in the memory of a video decoder in case that the video decoder is operating in a fast playmode, but all video data it is output through the output terminal of the video decoder after being stored in the memory and decoded in the case that the video decoder is operating in a normal playmode.

4 Claims, 6 Drawing Sheets

|←——————————————— ONE SECOND ———————————————→|

I B B P B B P B B P B B P B B I B B P B B P B B P B B P B B
1 2 3 4 5 6 7 8 9 10 11 12 13 14 15 16 17 18 19 20 21 22 23 24 25 26 27 28 29 30

APPARATUS AND METHOD FOR DECODING MPEG VIDEO DATA

BACKGROUND OF THE INVENTION

1. Field of the Invention

The present invention relates to an apparatus and method of decoding encoded data using MPEG (Moving Picture Experts Group) which is an international standard for compressing and decoding digital video data. More particularly, the present invention relates to an apparatus for decoding the video data using an optical disk, an optical magnetic disk, and a digital video cassette recorder (DVCR) tape and to an apparatus and method usable in systems such as an asynchronous transfer mode (ATM) and a satellite-broadcast. The present application is based upon Korean Application No. 3411/1996, which is incorporated herein by the reference.

2. Description of the Related Art

FIG. 1 illustrates a block diagram of an MPEG video data decoder known in the prior art. In this device, an input bit stream compressed in the MPEG format is generally transmitted by an external processor controlling the MPEG video decoder. The input bit stream is stored in the bit stream buffer of an external memory 50 after passing through an encoded data input unit 10 and a memory interface unit 40. In the prior art, a special dynamic random access memory refresh is necessary because a cheap DRAM is generally used in the external memory 50. The DRAM processing speed is lower than that of a static random access memory (SRAM). The input bit stream is read by the bit stream buffer of the external memory 50 and input into a data decoding unit 20. Then, an actual MPEG video decoding operation is performed. The digital video data decoded through the above process is recorded in a frame buffer of the external memory 50 after passing through the memory interface unit 40. In MPEG video decoding operations, certain forms of image data cannot be decoded without reading and referring to digital video data decoded and recorded in the frame buffer, which is accessed through the memory interface unit. Consequently, the data stored in the external memory must be read frequently. The decoded digital video data, which is recorded in the frame buffer through the operation described above, is output after being read by a digital video output unit 30 at a predetermined time. The output of the data decoding unit 20 is made with reference to the frame buffer of the external memory 50. This is because the sequence of the video frames to be ideally decoded is different from that of the video frames actually displayed in the MPEG video, and the time when the video frames are decoded is not the same as the time when they should actually be displayed. Therefore, an apparatus such as the frame buffer of the external memory 50 is necessary to help the digital video output unit 30 output the data into its original form by controlling frame order and timing. The data which is referred to for decoding other frames should be kept in the digital video data form for a predetermined time in order to decode dependent frames into its original form even though reference frames have already passed through the digital video output unit. In short, the encoded data input unit 10, the data decoding unit 20, and the digital video output unit 30 work independently and in parallel at the same time using the external memory 50 through the memory interface unit 40.

FIG. 2 illustrates a diagram showing the concept of images I, P, and B according to the definition of the MPEG. An image I, which is encoded using only the information of the image itself, can be decoded without reference to other images. However, an image P must be decoded with reference to another frame in a forward prediction sequence because the image P is an output of encoded image data I or P through forward prediction to produce the best picture quality. An image B also cannot be decoded without reference to other image frames. In the case of B images, two kinds of image data used in a two-way prediction are referenced because the image B is an output of encoded past s and future images (I and P) data through two-way prediction. Therefore, the frame buffer of FIG. 1 stores the digital data of three types of frames which are used in decoding as well as in outputting the data.

FIG. 3 illustrates a diagram of an image construction of MPEG data according to the National Television System Committee (NTSC). General MPEG data for one second is divided into the images I, B, and P. Thirty frames are displayed for one second and comprise 2 frames of image I, 8 frames of image P, and 20 frames of image B. The image B occupy the most frames, and as set forth above, the image B needs two frames in order to decode the data. Consequently, frequent operations of reading and writing the frame buffer of the external memory through the memory interface are required. In case the fast forward play or fast reverse play mode is activated in a video cassette recorder (VCR) for example, only the images I in random access memory are displayed and realized in general. Because the image I is encoded independently and can be decoded with only the information of the image itself, the image I can be decoded even though other images have not been decoded yet. As the processing speed is improved, the image P as well as the image I can be displayed and realized in the case of a faster play because the image P needs only one decoded reference frame.

The performance of the MPEG video decoder is determined based on how much bit stream it can decode, or how fast the decoder can receive the input data. In the construction of FIG. 1, the encoded data input unit 10, the data decoding unit 20, and the digital video output unit 30, work independently and simultaneously and use the same external memory through the same memory interface unit 40. In such a construction, the performance of the MPEG video decoder is influenced by the efficient use of the memory interface unit 40. In general, more frequent access to the external memory 50 lowers the performance of the MPEG video decoder. In the present invention, not all the input data, only the image I or the images I and P are decoded for display in case of the fast play.

In the prior art, however, unnecessary data (image B or P) is also recorded in the bit stream buffer of the external memory 50. The data decoding unit 20 reads all data and subsequently abandons data judged to be unnecessary in performing data decode for a particular mode. The reading and decoding of the extraneous data takes a significant processing time. There is another problem in displaying images naturally in case of the fast play mode because the load caused by reading and recording the unnecessary data through the memory interface unit limits the data input speed of the decoder.

SUMMARY OF THE INVENTION

Accordingly, it is an object of the present invention to provide a decoder and decoding method of improving the performance of the decoder and realizing more natural fast play by removing the functions of recording, reading, and processing unnecessary data in the case where the MPEG video decoder is in the fast play mode. It is a further object of the invention to improve decoder performance by performing other functions during the interval normally used to process the unnecessary data.

To achieve these and other objects, there is provided an apparatus for decoding and reproducing MPEG video data, comprising: an encoded data input unit for receiving said MPEG video data and outputting a data signal; a data analyzing unit for receiving said data signal, which corresponds to a respective portion of the video data, and deciding whether said respective portion of the video data should be decoded or not and generating an output signal based on the decision; a memory interface unit for outputting a control signal in response to the output signal of said data analyzing unit; an external memory unit for storing said respective portion of said video data based on said control signal; a data decoding unit for reading and decoding said respective portion of said video data stored in said external memory unit and restoring the MPEG data in said external memory unit; and a digital video output unit for reading said decoded data out of said external memory unit and outputting the data at a predetermined time.

BRIEF DESCRIPTION OF THE DRAWINGS

A more complete appreciation of the invention, and many of the attendant advantages thereof, will become apparent by reference to the following detailed description considered in conjunction with the accompanying drawings in which like reference symbols indicate the same or similar components, wherein.

DETAILED DESCRIPTION OF THE PREFERRED EMBODIMENT

With reference to the attached drawings, a preferred embodiment of the invention will be described below in detail.

Figure 1:
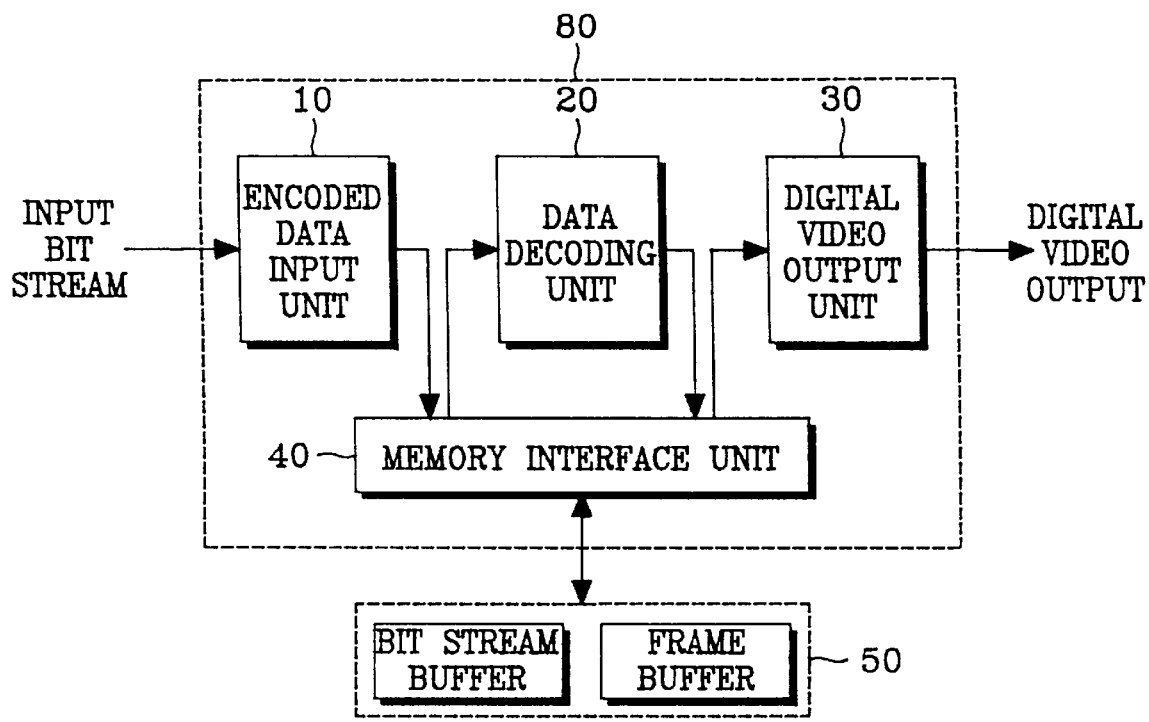
FIG. 1 is a block diagram of an MPEG video data decoder according to the prior art.
Figure 2:
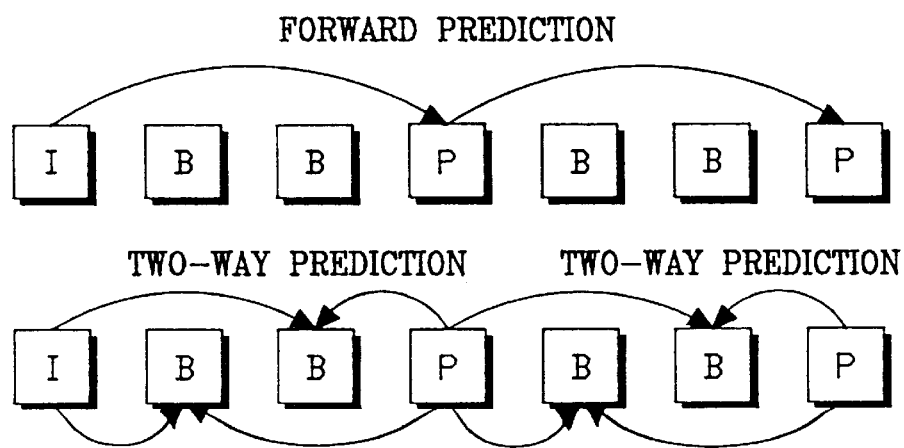
FIG. 2 is a diagram showing the relationship among general images I, B, and P comprising MPEG video data.
Figure 3:
FIG. 3 is a diagram of an image construction of MPEG data according to a national television system committee (NTSC)
Figure 4:
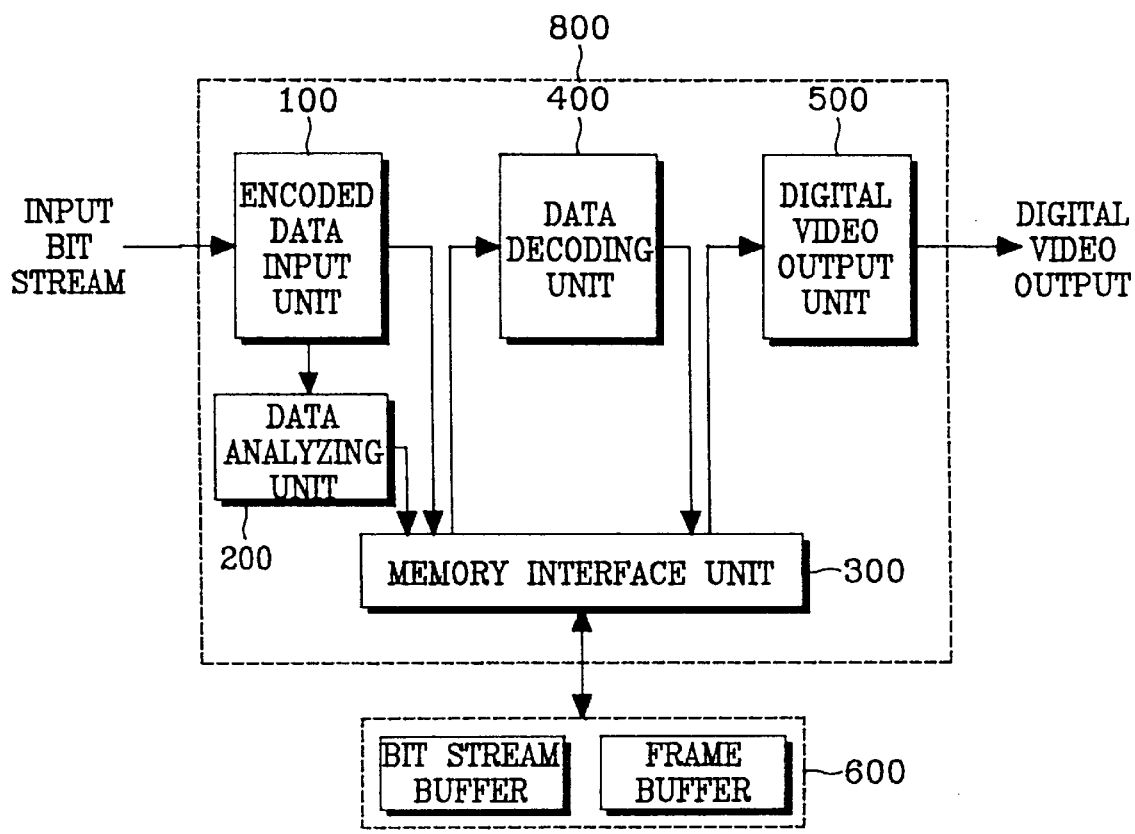
FIG. 4 is a block diagram of an MPEG video data decoder according to the present invention.

As shown in FIG. 4, an input bit stream of MPEG video data is input into an encoded data input unit 100 and recorded in a bit stream buffer of an external memory unit 600 after passing through a data analyzing unit 200 and a memory interface unit 300. The data analyzing unit 200 enables all the input data to be recorded in the bit stream buffer in case that the MPEG video decoder 800 is operating in a normal play mode. The data analyzing unit filters the data not intended to be decoded and keeps the unnecessary data from being recorded in the bit stream buffer in case the MPEG video decoder 800 is operating in a fast play mode. The input bit stream is input into the data decoding unit 400 after being read in the bit stream buffer of the external memory 600. Then an actual MPEG video decoding operation is performed in the data decoding unit 400. The decoded digital video data is recorded in the frame buffer of the external memory unit 600 through the memory interface unit 300. In the MPEG video decoding operation, some kinds of data can be decoded while reading the reference frames decoded and recorded in the frame buffer in advance through the memory interface unit 300. The decoded digital video data, which is recorded in the frame buffer through the operations described above, is output after being read by a digital video output unit 500 at the predetermined time.

Figure 5:
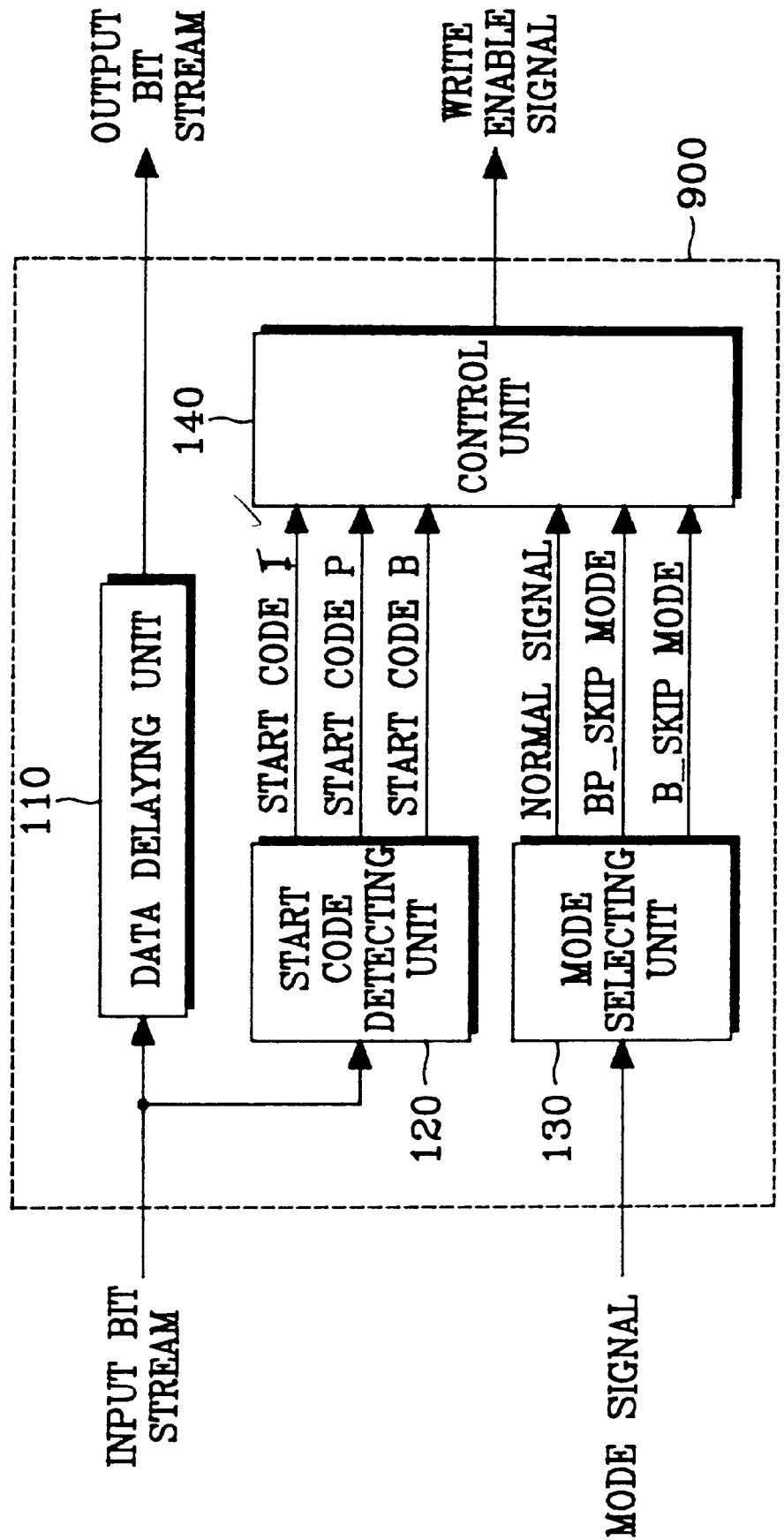
FIG. 5 is a block diagram of a data analyzing unit shown in FIG. 4.

As shown in FIG. 5, the input bit stream is output through a data delaying unit 110. The delay is kept until a start code detecting unit 120 detects the start code, and a control unit 140 generates a control signal. The start code detecting unit 120 detects image start codes I, P, and B from the input data. Since all the MPEG data is encoded using an encoding method of a variable length, the size of the encoded image is variable according to the complexity and brightness of the image and an interrelation with the past and future images so that the position and meaning of the data cannot be inferred until variable length decoding (VLD) is performed. However, all the start codes used in the MPEG are set in units of a byte so that the start code can be detected by judging the data in units of a byte. A mode selecting unit 130 selects an operation mode of the data analyzing unit based on an input mode signal. The mode selecting unit 130 generates a normal signal in case of a normal play, BP_Skip mode signal reproducing only the I image in the case of the fast play mode, and B_Skip mode signal reproducing only the images I and P in the case of the faster play mode. The control unit 140 generates a write enable signal indicating that the data should be recorded in the memory, using the start codes I, P, and B generated by the start code detecting unit 120 and using the normal, BP_Skip mode, and B_Skip mode signals generated by the mode selecting unit 130. In case that the output of the mode selecting unit 130 is normal, since all the input data should be recorded, the control unit 140 activates the write enable signal so that the memory recording signal will be generated for all data. The control unit 140 also generates the proper write enable signal for the purpose of recording the images corresponding to the BP_Skip mode and B_Skip mode signals in the case where the mode selecting unit generates the BP_Skip mode or B_Skip mode signals.

Figure 6:
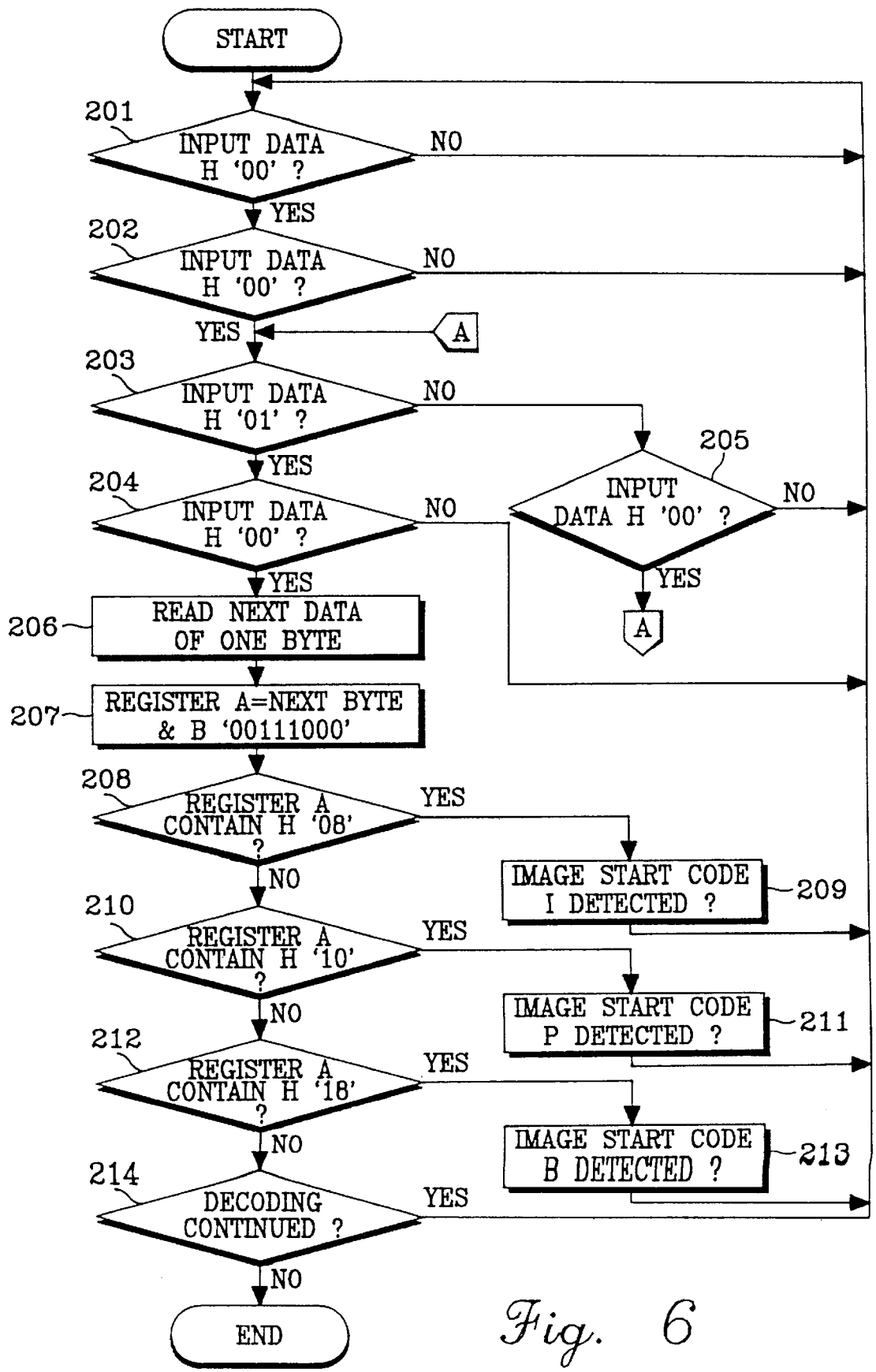
FIG. 6 is a detailed flow chart of a start code detecting unit shown in FIG. 5.

As shown in FIG. 6, the image start code of the MPEG is fixed in hexa (H), "00 00 01 00". Since all the start codes are set in units of a byte, it must be decided that the H "00 00 01 00" is input sequentially while the data is read in units of byte. Steps 201 to 204. Since an infinite number of H "00" can be inserted before the start code, there should be a step 205 for checking whether H "00" is added when H "01" is not input at the point where H "01" is expected in the start code. If the image start code is detected in step 206, the type of the image is determined with the three bits of eleventh, twelfth, and thirteenth bits. Bit (B) "001" represents the image I. Steps 208 and 209. B "010" represents the image P. Steps 210 and 211. B "011" represents the image B. Steps 212 and 213. After the image start code is detected, only the next one byte is read. The next new byte is read and then stored in a predetermined register A and an AND operation is performed with B "0011 1000". This operation isolates the three bits corresponding to the eleventh, twelfth, and thirteenth bits following the image start code. When the register A contains H "08", data is for the I type image so that the start code signal I is generated, which means the image start code I is detected. When the register A contains H "10", data is for the P type image so that the image start code signal P is generated, which means the image start code P is detected. When the register A contains H "18", data is for the B type image so that the image start code signal B is generated, which means the image start code B is detected. The operation described above will be continued if the MPEG video decoder is in operation, otherwise the above operation will be finished.

Figure 7:
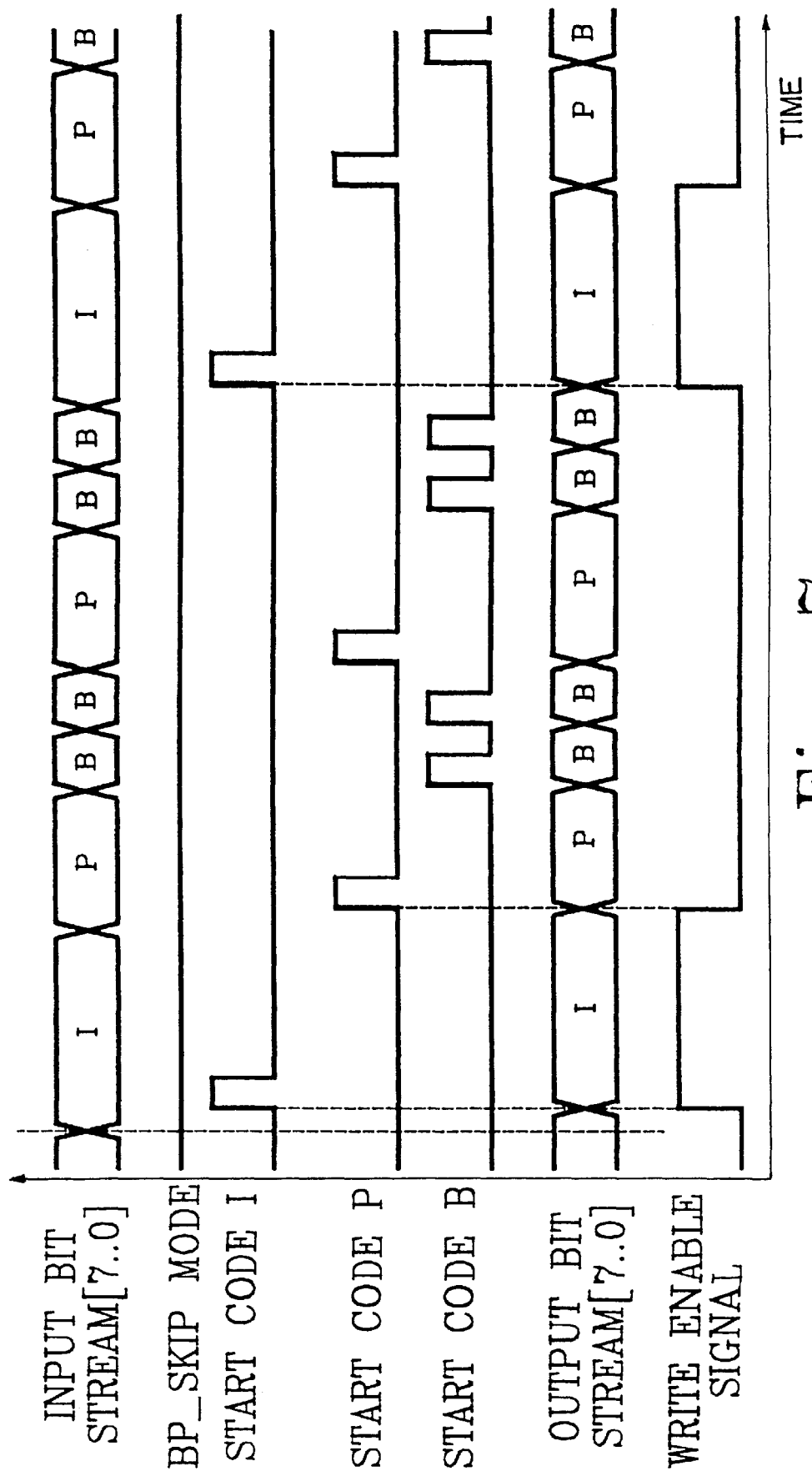
FIG. 7 is a first timing diagram of a control unit shown in FIG. 5.

As shown in FIG. 7, a first timing diagram represents the timing of the BP_Skip mode when only the image I is decoded. It takes a predetermined time for the start code detecting unit to detect the various start codes from the input bit stream after respective images are started. Therefore, the input bit stream is output as an output bit stream after a delay until the start codes are detected. When the start code I is detected, the write enable signal is activated to record the data in the memory. When the start code P or B is detected, the write enable signal is disabled not to record the image data in the memory.

Figure 8:
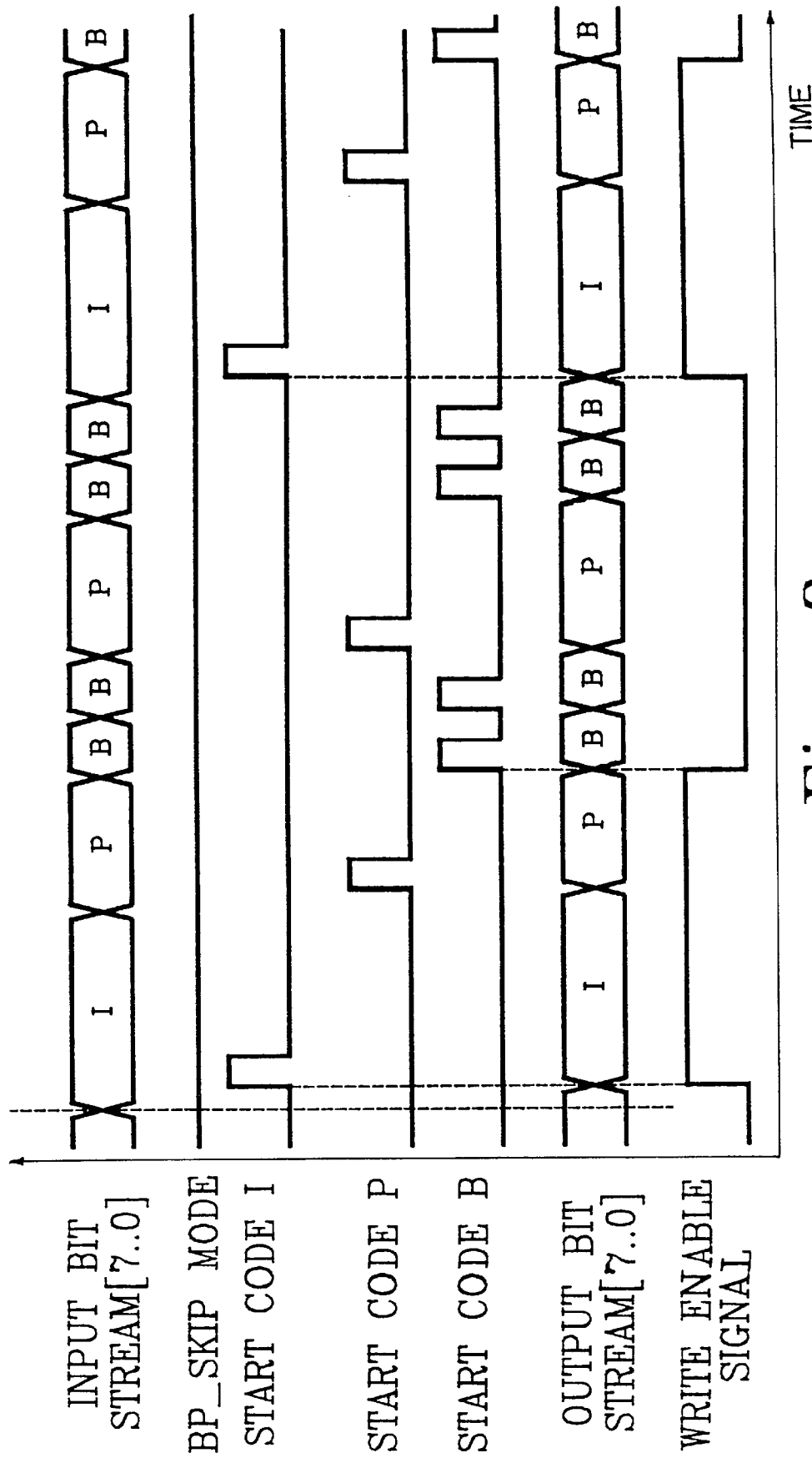
FIG. 8 is a second timing diagram of the control unit shown in FIG. 5.

As shown in FIG. 8, a second timing diagram represents the timing of the BP_Skip mode when only the images I and P are decoded. It takes the predetermined time for the start code detecting unit to detect the various start codes from the input bit stream after the respective images are started. Therefore the input bit stream is output as the output bit stream after a delay until the start codes are detected. When the start code I or P is detected, the write enable signal is activated to record the data in the memory. When the start code B is detected, the write enable signal is disabled not to record it in the memory.

Consequently, in case of the fast play mode, the MPEG video decoder does not record the data which is not expected to be decoded in the memory. Since the present invention does not waste time reading and writing unnecessary data to and from the memory, the decoder can perform other processes during this time which was previously used for extraneous read and write operations of unnecessary B and/or P image data. Accordingly, the performance of the decoder can be improved. This improvement decreases the load of the decoder, with the result that the decoder can process more data and realize more natural fast play of the image information.

Therefore, it should be understood that the present invention is not limited to the particular embodiment disclosed herein as the best mode contemplated for carrying out the present invention. One skilled in the art would recognize that other features and embodiments are also possible without departing from the spirit and scope of the appended claims.

What is claimed is:

1. An apparatus for decoding and reproducing MPEG video data, comprising:
   an encoded data input unit for receiving said MPEG video data and outputting a data signal;
   a data analyzing unit for receiving said data signal and deciding whether said data signal should be decoded or not;
   a memory interface unit for outputting a control signal in response to an output signal of said data analyzing unit;
   an external memory unit for storing said MPEG video data to be decoded based on said control signal but not storing said MPEG video data that is not to be decoded;
   a data decoding unit for reading and decoding said MPEG video data stored in said external memory unit and for restoring the MPEG data in said external memory unit; and
   a digital video output unit for reading said decoded data out of said eternal memory unit and outputting the data at a predetermined time.

2. An apparatus for decoding and reproducing MPEG video data, comprising:
   an encoded data input unit for receiving said MPEG video data and outputting a data signal;
   a data analyzing unit for receiving said data signal, which corresponds to a respective portion of the video data, and deciding whether said respective portion of the video data should be decoded or not and for generating an output signal based on the decision;
   a memory interface unit for outputting a control signal in response to the output signal of said data analyzing unit;
   an external memory unit for storing said respective portion of said video data to be decoded based on said control signal but not storing said video data that is not to be decoded;
   a data decoding unit for reading and decoding said respective portion of said video data stored in said external memory unit and restoring the video data in said external memory unit; and
   a digital video output unit for reading said decoded data out of said eternal memory unit and outputting the data at a predetermined time.

3. The apparatus as claimed in claim 2, wherein said data analyzing unit comprises:
   a data delaying unit for delaying said MPEG video data for a predetermined time;
   a start code detecting unit for receiving said MPEG video data and detecting an image start code from the respective portions of said video data;
   a mode selecting unit for selecting an operation mode based on an externally input mode signal; and
   a control unit for generating a signal which allows only the data to be decoded to be stored in said external memory interface unit based on the detected image start code and said selected operation mode.

4. A video data decoding method for decoding and reproducing MPEG video data using a video decoding apparatus, said apparatus operable in several modes and including an external memory, said method comprising the steps of:
   reading in a plurality of sections of said MPEG video data until a start code is detected in the plurality of sections;
   determining a reproducing mode of the decoding apparatus;
   storing all sections of video data in the external memory when the reproducing mode corresponds to a normal mode;
   determining a type of the image data when the reproducing mode does not correspond to a normal mode and selectively storing sections of video data in the external memory in accordance with the reproducing mode but not storing said video data that is not be reproduced;
   reading data from the external memory to reproduce the image data in the determined reproducing mode.

* * * * *